United States Patent
Wakamiya

(10) Patent No.: US 10,250,829 B2
(45) Date of Patent: Apr. 2, 2019

(54) IMAGE PROCESSING APPARATUS THAT USES PLURALITY OF IMAGE PROCESSING CIRCUITS

(71) Applicant: CANON KABUSHIKI KAISHA, Tokyo (JP)

(72) Inventor: Daisuke Wakamiya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/663,937

(22) Filed: Jul. 31, 2017

(65) Prior Publication Data

US 2018/0063455 A1 Mar. 1, 2018

(30) Foreign Application Priority Data

Aug. 29, 2016 (JP) ................................. 2016-167286

(51) Int. Cl.
| | |
|---|---|
| *H04N 5/365* | (2011.01) |
| *H04N 5/232* | (2006.01) |
| *H04N 5/345* | (2011.01) |
| *H04N 5/361* | (2011.01) |
| *H04N 5/374* | (2011.01) |

(52) U.S. Cl.
CPC ....... *H04N 5/3655* (2013.01); *H04N 5/23293* (2013.01); *H04N 5/3454* (2013.01); *H04N 5/361* (2013.01); *H04N 5/3742* (2013.01)

(58) Field of Classification Search
CPC ............. H04N 5/3655; H04N 5/23293; H04N 5/3454; H04N 5/361; H04N 5/3742
See application file for complete search history.

(56) References Cited

U.S. PATENT DOCUMENTS

| | | | |
|---|---|---|---|
| 9,565,378 B2 | 2/2017 | Takahashi et al. | |
| 2011/0013052 A1* | 1/2011 | Yanai | H04N 5/361 348/243 |

FOREIGN PATENT DOCUMENTS

JP 2015-053645 A 3/2015

* cited by examiner

*Primary Examiner* — Twyler L Haskins
*Assistant Examiner* — Fayez Bhuiyan
(74) *Attorney, Agent, or Firm* — Venable LLP

(57) ABSTRACT

An image processing apparatus comprises: a first circuit; and a second circuit connected to the first circuit; wherein the first circuit receives image data obtained by an image sensor including a vertical light-shielded region and an effective region, and applies, on image data of a first region which is a portion of the effective region of the image data, predetermined image processing by using image data of the vertical light-shielded region, the first circuit sets a second region and consecutively transmits to the second circuit image data of the vertical light-shielded region and unprocessed image data of the second region, and the second circuit receives the transmitted image data, and applies the predetermined image processing to the received image data by using the received image data of the vertical light-shielded region.

13 Claims, 9 Drawing Sheets

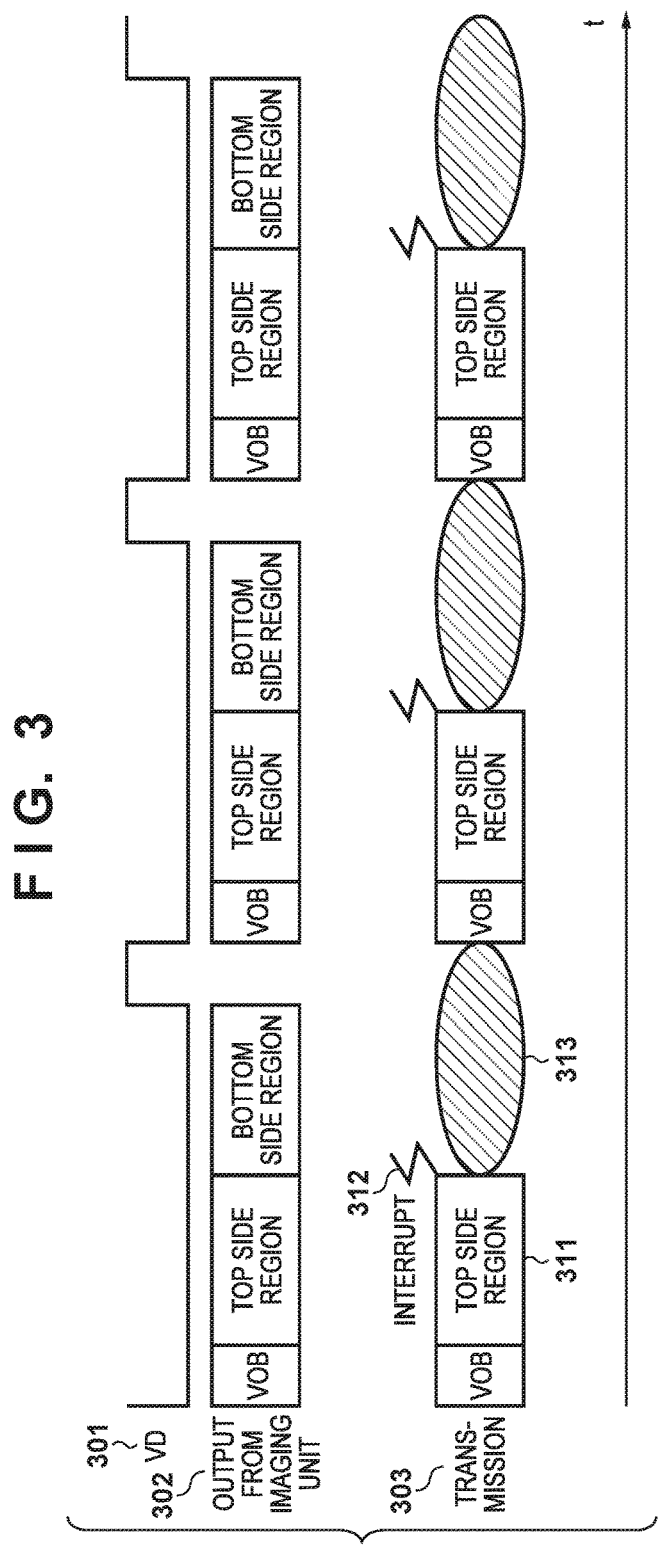

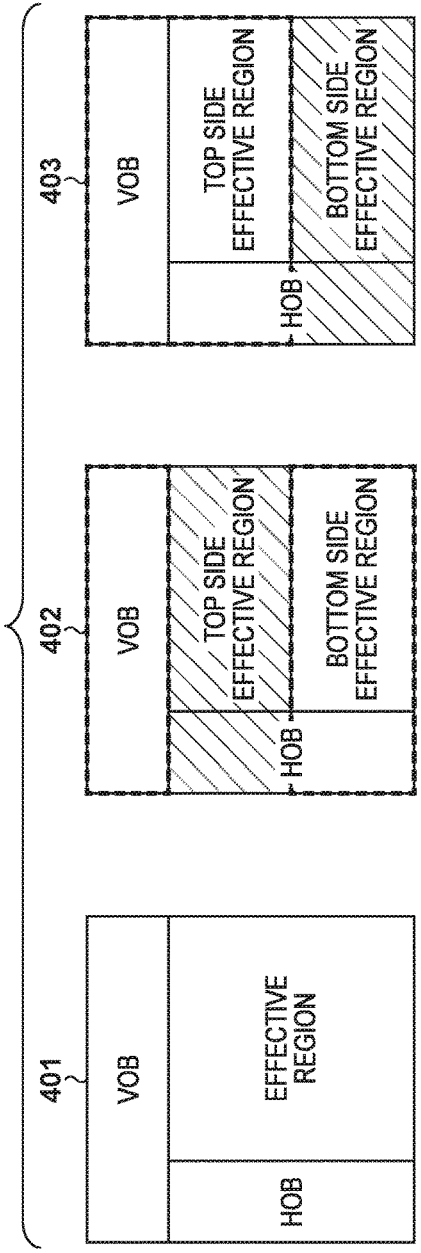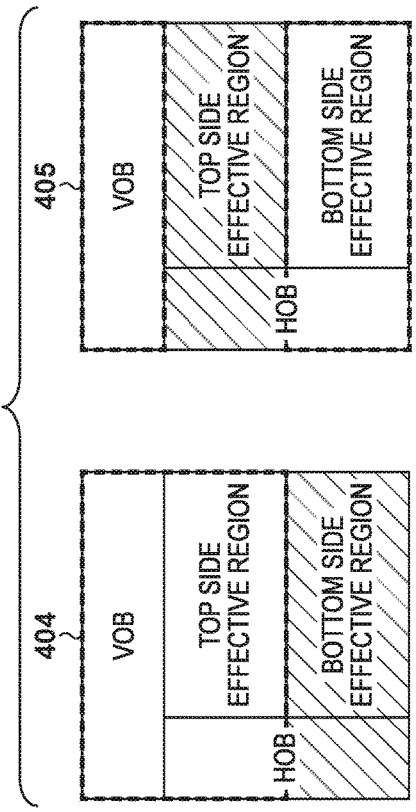

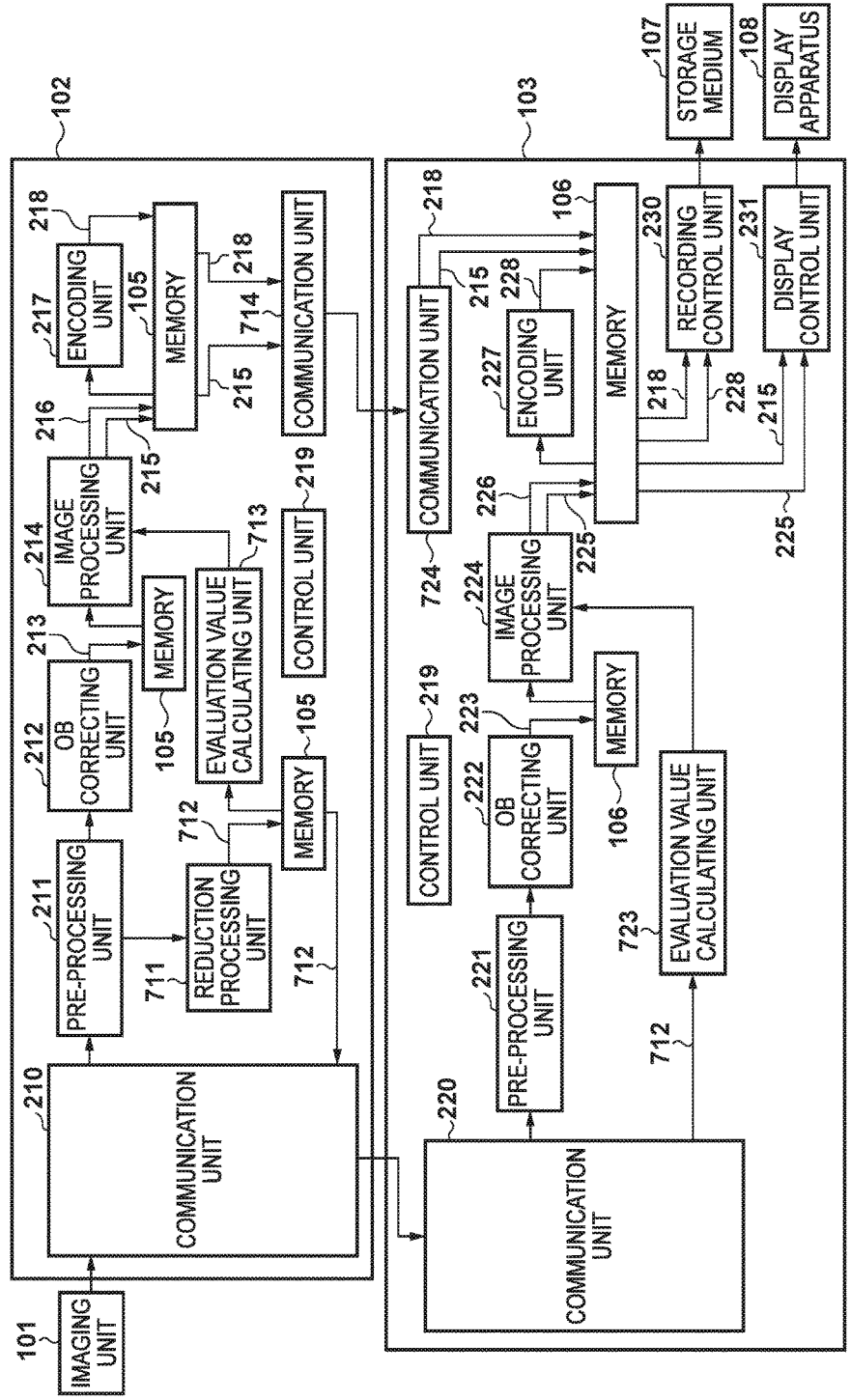

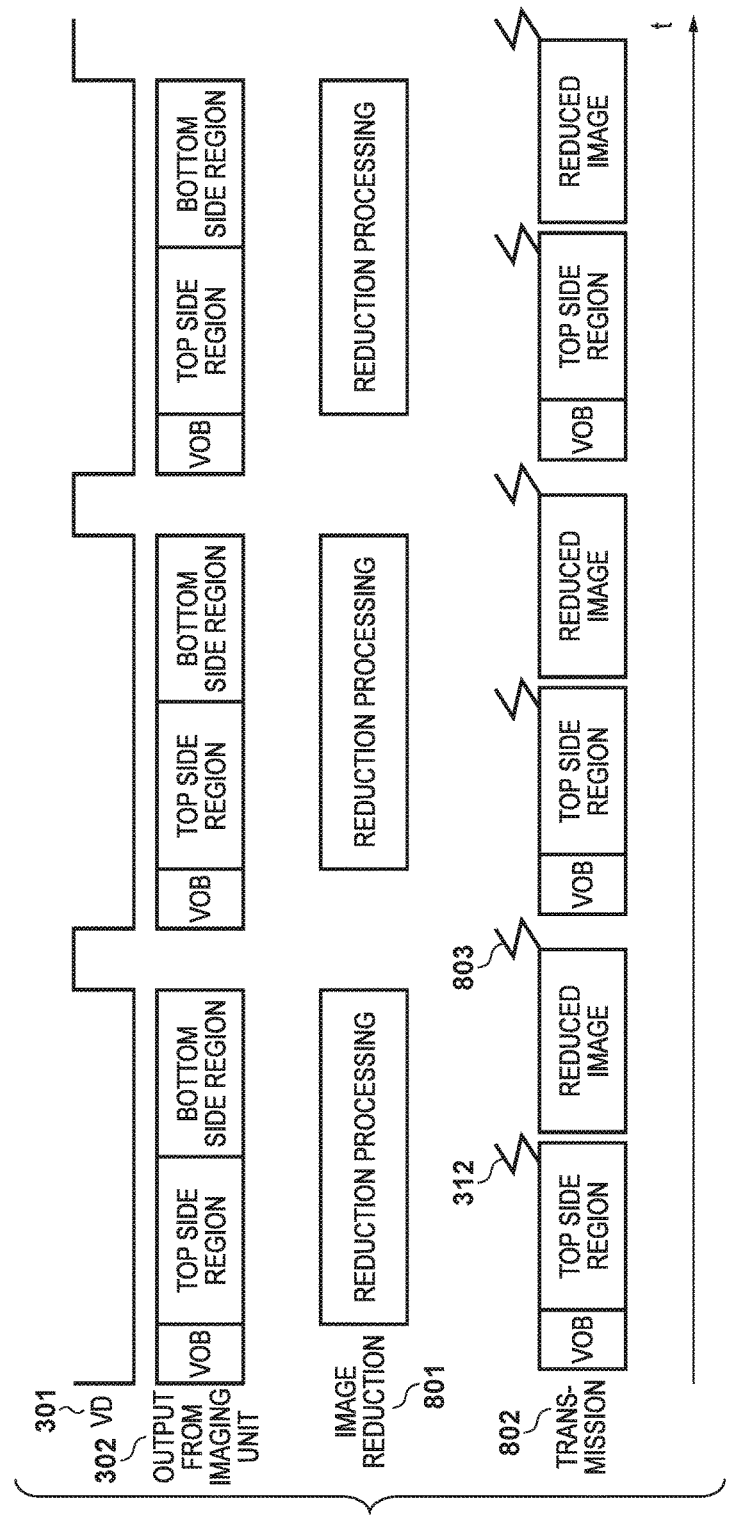

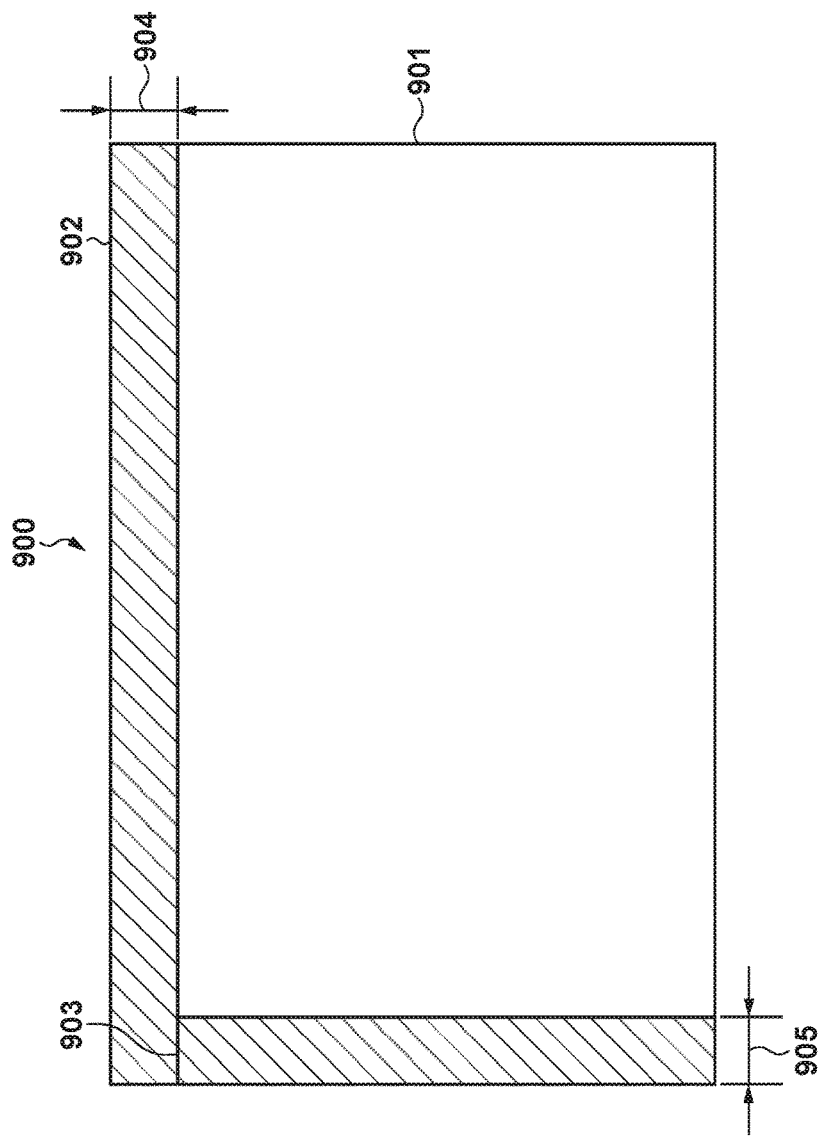

IMAGE PROCESSING APPARATUS THAT USES PLURALITY OF IMAGE PROCESSING CIRCUITS

BACKGROUND OF THE INVENTION

Field of the Invention

The present invention relates to an image processing apparatus that uses a plurality of image processing circuits.

Description of the Related Art

In recent years, in accompaniment of an increase in pixels in image sensors and an increase in frame rates of moving images, an amount of data processed per second has increased, and a processing load on an image processing circuit that processes image data outputted from an image sensor has increased. In image data outputted from an image sensor, in addition to a pixel signal of an effective region in which an object image is formed, a pixel signal of an optical black region (Optical Black: OB) of multiple rows and multiple columns that is arranged in the periphery of the effective region and that is always light-shielded is included. An image processing circuit, on top of having performed correction processing for reducing a noise component in a pixel signal of the effective region by using a pixel signal of the OB area, performs other predetermined image processing on the image signal of the effective region.

Because there are cases in which processing cannot be completed entirely in one image processing circuit due to an increased image sensor data amount, a configuration in which, by using a plurality of image processing circuits, a processing load of each image processing circuit is reduced (Japanese Patent Laid-Open No. 2015-53645) has been proposed. Japanese Patent Laid-Open No. 2015-53645 discloses a technique of inputting image data outputted from an imaging unit into two image processing circuits (imaging processing units), extracting divided image regions, and performing correction processing by using signals of an OB area and an effective region that are extracted.

However, the technique disclosed in Japanese Patent Laid-Open No. 2015-53645, in relation to two imaging processing units, first inputs all image data outputted from an imaging unit into the respective imaging processing units, and then, in each of the imaging processing units, extracts the regions to be processed and performs processing. Accordingly, cost reduction is difficult since it requires a configuration in which a large amount of moving image data is inputted at high speed in relation to each imaging processing unit. Also, in the configuration of Japanese Patent Laid-Open No. 2015-53645, each imaging processing unit must take as input and process the whole image, and so there are cases in which reduction of processing load and acceleration of processing cannot be performed sufficiently.

SUMMARY OF THE INVENTION

The present invention has been made in consideration of the aforementioned problems, and realizes a technique in which it is possible to, in a case where a plurality of image processing circuits are used, reduce the processing load on each image processing circuit and process image data at high speed.

In order to solve the aforementioned problems, one aspect of the present invention provides an image processing apparatus comprising: an imaging unit comprising an image sensor including a vertical light-shielded region and an effective region that is not light-shielded; a first image processing circuit connected to the imaging unit; and a second image processing circuit connected to the first image processing circuit; wherein the first image processing circuit receives image data from the imaging unit, and applies, on image data of a first region which is a portion of the effective region of a frame of the image data received from the imaging unit, predetermined image processing by using image data of the vertical light-shielded region of the frame, the first image processing circuit, out of the effective region of the frame, sets, as a second region, a portion that is at least partially different to the first region and that is contiguous with the vertical light-shielded region, and consecutively transmits to the second image processing circuit image data of the vertical light-shielded region and unprocessed image data of the second region to which the predetermined image processing has not been applied, and the second image processing circuit receives the image data of the vertical light-shielded region of the frame and the unprocessed image data of the second region transmitted from the first image processing circuit, and applies the predetermined image processing to the received image data of the second region by using the received image data of the vertical light-shielded region.

Another aspect of the present invention provides, an image processing apparatus comprising: an imaging unit comprising an image sensor including a vertical light-shielded region and an effective region that is not light-shielded; a first image processing circuit connected to the imaging unit; and a second image processing circuit connected to the first image processing circuit; wherein the first image processing circuit receives image data from the imaging unit, and applies, on image data of a first region which is a portion of the effective region of a frame of the image data received from the imaging unit, predetermined image processing by using image data of the vertical light-shielded region of the frame, the first image processing circuit transmits to the second image processing circuit the image data of the vertical light-shielded region of the frame and unprocessed image data to which the predetermined image processing has not been applied of a second region which is at least partially different to the first region out of the effective region of the frame, and the second image processing circuit receives the image data of the vertical light-shielded region of the frame and the unprocessed image data of the second region transmitted from the first image processing circuit, and applies the predetermined image processing to the received unprocessed image data of the second region by using the received image data of the vertical light-shielded region.

According to the present invention, in a case where a plurality of image processing circuits are used, it is possible to reduce a processing load on each image processing circuit, and process image data at high speed.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3 is a view illustrating schematically an example of image data transmission timing according to the first embodiment.

FIGS. 4A through 4B are views for explaining images processed in each image processing circuit according to the first embodiment.

FIG. 7 is a block diagram for explaining an example of a functional configuration of the image processing circuit according to a second embodiment.

FIG. 8 is a view illustrating schematically an example of image data transmission timing according to the second embodiment.

FIG. 9 is a view for explaining a pixel arrangement of a light-receiving surface of an image sensor according to first and second embodiments.

DESCRIPTION OF THE EMBODIMENTS

First Embodiment

Exemplary embodiments will be described hereinafter in detail, with reference to the drawings. Note that below an example that uses a digital camera comprising a plurality of image processing circuits is described as an example of an image processing apparatus. However, the present embodiment is not limited to a digital camera, and can be applied to any device in which image processing by a plurality of processing units is possible. Such a device may include, for example, a personal computer, a mobile telephone such as a smart phone, a game device, a tablet terminal, a clock-type or glasses-type information terminal, a medical device, a monitoring system, an in-vehicle camera, a server device operating in a data center, or the like. Also, in the example below, an example in which image data is divided amongst a plurality of image processing circuits and then processed is described, but configuration may be taken for application to a case where the image data is divided among a plurality of apparatuses or a plurality of virtual machines and then processed.

(Configuration of Digital Camera 100)

Figure 1:
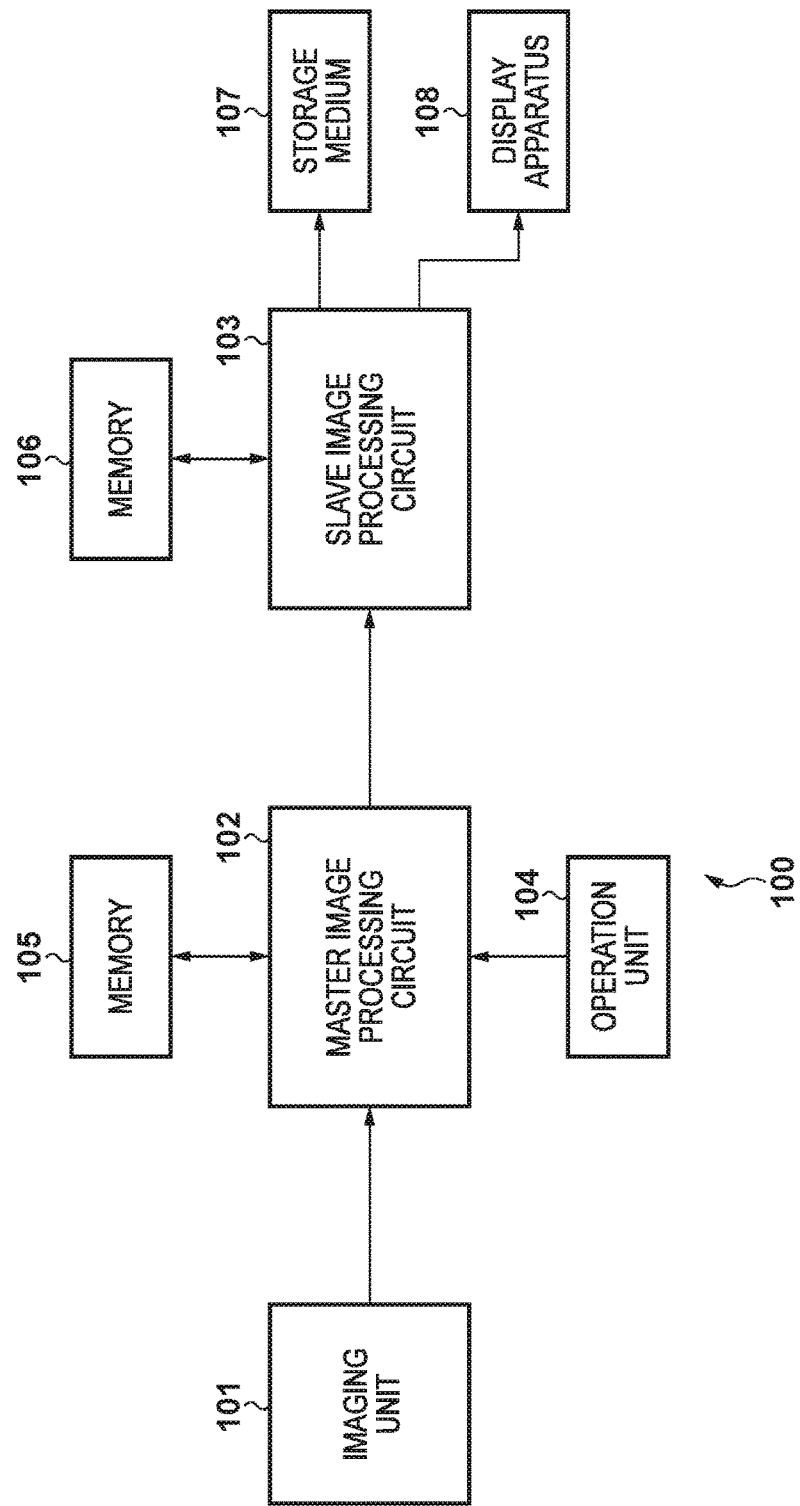
FIG. 1 is a block diagram illustrating an example of a functional configuration of a digital camera as an example of an image processing apparatus according to a first embodiment.

FIG. 1 illustrates an example of a functional configuration of a digital camera 100 as an example of an image processing apparatus according to the present embodiment. An imaging unit 101 includes an imaging optical system such as a lens, an aperture, and the like, an image sensor such as a CMOS sensor, an AD converter for converting an image signal from the image sensor into a digital signal, and a driving unit for driving each of these configurations. The imaging unit 101, by the image sensor, performs a photoelectric conversion of an optical image of an object that passed through the imaging optical system, and converts an obtained image signal into image data which is a digital signal. The imaging unit 101 outputs moving image data by the image sensor outputting an image signal (hereinafter may be referred to simply as a frame) for each frame at a predetermined frame rate. All of the outputted frames of moving image data are inputted into a master image processing circuit 102.

The master image processing circuit 102 processes a region (bottom side region) in a bottom side portion of each frame from the imaging unit 101, and then sends the data to a slave image processing circuit 103 without processing other regions. Also, as is described later, the master image processing circuit 102 processes a region (top side region) in a top side portion of each frame from the imaging unit 101, and then sends the data to the slave image processing circuit 103 without processing other regions. The slave image processing circuit 103 processes the top side region of each frame transmitted from the master image processing circuit 102. Also, the slave image processing circuit 103 receives data of the bottom side region that is processed already from the master image processing circuit 102, and generates image data of one whole frame together with the region that the slave image processing circuit 103 processed. The slave image processing circuit 103 stores the generated image data in a storage medium 107, and also sends the data to a display apparatus 108.

An operation unit 104 comprises a power supply switch, and various other operation switches such as for starting and stopping of recording, and transmits a user's instructions to the master image processing circuit 102. Memories 105 and 106 may be a volatile memory such as a DRAM or the like, and are respectively connected to the master image processing circuit 102 and the slave image processing circuit 103. Note that in the present embodiment, an example of a case in which the master image processing circuit 102 and the slave image processing circuit 103 are each configured as single chip image processing integrated circuit (IC) is described, but they may be realized by a general-purpose processor and software. Also, the memories 105 and 106 are configured as separate ICs to the master image processing circuit 102 and the slave image processing circuit 103.

The storage medium 107 includes a memory card, a hard disk, or the like, for example, and stores image data or moving image data captured via the imaging unit 101. The storage medium 107 may be configured to be detachable so long as it can store captured image data and video data. The display apparatus 108 includes a monitor configured by, for example, an LCD or OLED panel, and displays captured image data or video data or data stored in the storage medium 107.

(Configuration of Image Sensor of Imaging Unit 101).

Next, the image sensor of the imaging unit 101 will be described. FIG. 9 illustrates a light receiving unit 900 in an image sensor of the imaging unit 101. The light receiving unit 900 has a plurality of light receiving devices arranged two-dimensionally in a Bayer arrangement (note that the Bayer arrangement is a color filter arrangement, but here it is treated as a light receiving device arrangement for convenience). Each light receiving device corresponds to one pixel. Also, a region of some of the light receiving units is a light-shielded region where object light is blocked (light-shielded). The output of the pixels of the light-shielded region represents an offset of a signal according to a noise component that is superimposed on a pixel signal in a case where light is not received (therefore pixels of the light-shielded region are also referred to as reference pixels). The light receiving unit 900, as illustrated in FIG. 9, includes an effective region 901 which is a region in which light is not shielded, a vertical light-shielded region 902, and a horizontal light-shielded region 903. The vertical light-shielded region 902 is arranged to be a fixed width from the top edge in the top region of the light receiving unit 900, for example. A width 904 represents a width from the top edge of the vertical light-shielded region 902. Also, the horizontal light-shielded region 903 is arranged to be a fixed width from the left edge in the left region of the light receiving unit 900, for example. A width 905 represents a width from the left edge of the horizontal light-shielded region.

Image data is output in a sequential raster scan in pixel units from the edge portion of the main scanning line, starting with the main scanning line of the top edge of the light receiving device. In the present embodiment, the number of pixels of the effective region is horizontally 4096 pixels×vertically 2160 pixels. Also, the width 904 of the vertical light-shielded region is assumed to be n pixels, and the width 905 of the horizontal light-shielded region is assumed to be m pixels. Also, the imaging unit 101 outputs moving image data at 60 frames per second (fps). Note that image data corresponding to pixels of the vertical light-shielded region 902 (vertical light-shielded region) is also called VOB (Vertical Optical Black) data, and image data corresponding to pixels of the horizontal light-shielded region 903 (horizontal light-shielded region) is also called HOB (Horizontal Optical Black) data. Also, the image data from the imaging unit 101 is outputted in a Bayer arrangement state, and is in a state in which image processing has not been applied. Therefore, the image data from the imaging unit 101 is also referred to as RAW image data.

(Configurations of Master Image Processing Circuit 102 and Slave Image Processing Circuit 103)

Figure 2:
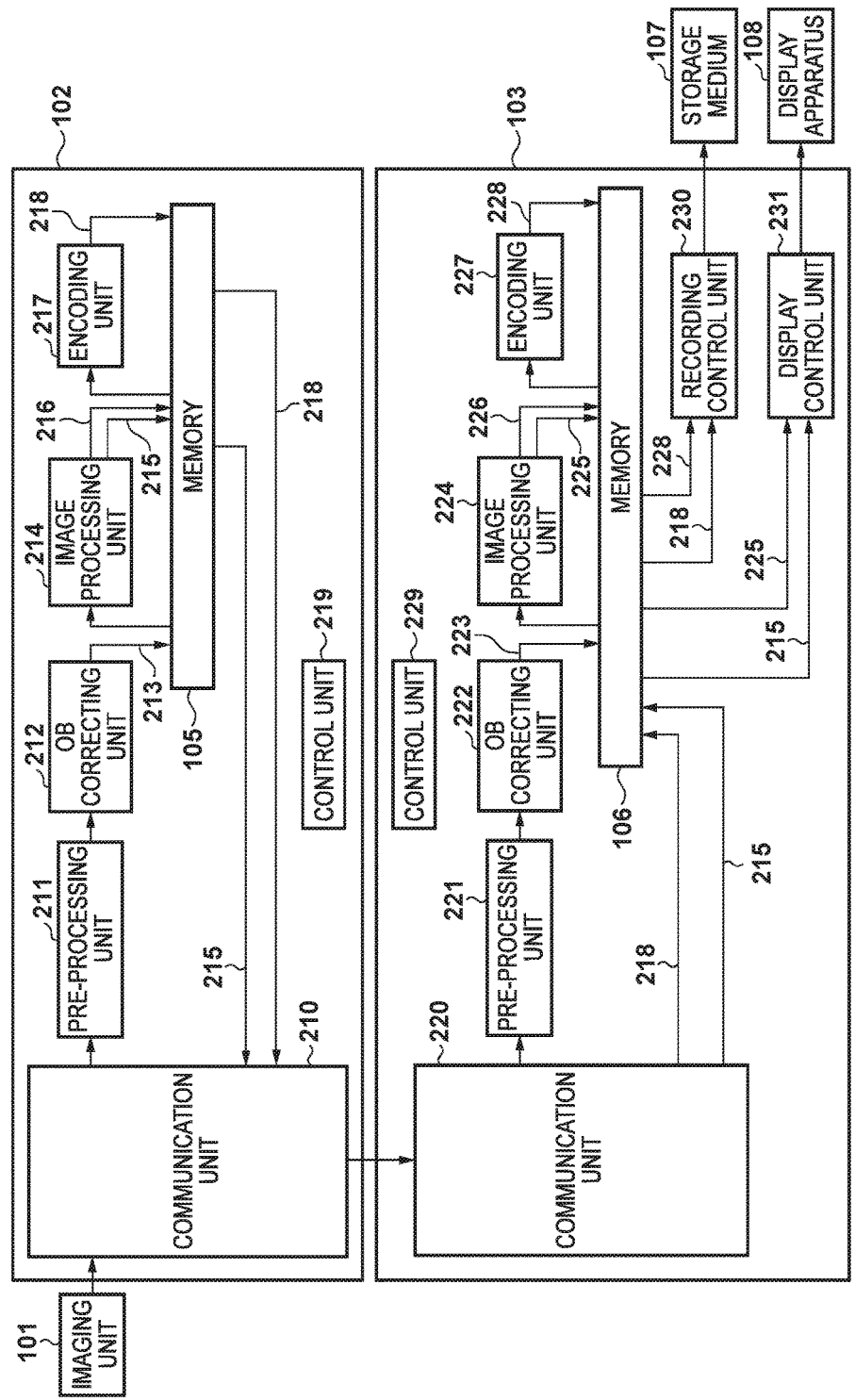
FIG. 2 is a block diagram for explaining an example of a functional configuration of an image processing circuit according to the first embodiment.

Next, with reference to FIG. 2, an example of a functional configuration of the master image processing circuit 102 and the slave image processing circuit 103 included in the digital camera 100 is described. The master image processing circuit 102 includes a communication unit 210, a pre-processing unit 211, an OB correcting unit 212, an image processing unit 214, an encoding unit 217, a control unit 219, and a memory controller (not shown). Meanwhile, the slave image processing circuit 103 includes a communication unit 220, a pre-processing unit 221, an OB correcting unit 222, an image processing unit 224, an encoding unit 227, a storage control unit 230, a display control unit 231, a control unit 229, and a memory controller (not shown). Note that the same configuration may be taken for the master image processing circuit 102 and the slave image processing circuit 103. Also, in FIG. 2, to make it easier to grasp the flow of signals, the memories 105 and 106 are within the blocks of the master image processing circuit 102 and the slave image processing circuit 103 respectively, but each of the memories is connected to the respective image processing circuit as in FIG. 1.

The communication unit 210 of the master image processing circuit 102 obtains each frame of moving image data including the OB areas outputted from the imaging unit 101. Also, the communication unit 210 transmits, to the slave image processing circuit 103, data of a region of a part of the top side in the effective region of each frame. Also, the communication unit 210 does not transmit to the slave image processing circuit 103 image data other than the portion of the top side in the effective region of each frame received from the imaging unit 101. Meanwhile, the communication unit 210 transmits to the pre-processing unit 211 image data of an entire frame for each frame of the image data received from the imaging unit 101. Furthermore, the communication unit 210 reads out a later-described display image 215 and stream image 218 from the memory 105, and transmits them to the slave image processing circuit 103.

Here, an example of the regions of the image processed by each of the processing circuits in the present embodiment is described with reference to FIG. 4A. Reference numeral 401 in the left view of FIG. 4A illustrates one frame of moving image data outputted from the imaging unit 101. As illustrated in 401, each frame from the imaging unit 101 includes an effective region, a vertical light-shielded region (VOB), and a horizontal light-shielded region (HOB).

Also, reference numeral 402 illustrates image data on which the master image processing circuit 102 performs predetermined image processing (the portions surrounded by dashed lines). The master image processing circuit 102 processes the VOB region, the effective region of the bottom side, and HOB data corresponding to each line of the effective region of the bottom side. Note that because the predetermined image processing is not performed in the master image processing circuit 102 on the effective region of the top side or the HOB data corresponding to the lines of the effective region of the top side, these are not stored in the memory 105.

Reference numeral 403 represents unprocessed image data (the portion that is surrounded by dashed lines) that is transmitted from the master image processing circuit 102 to the slave image processing circuit 103. The data transmitted to the slave image processing circuit 103 is image data of the effective region of the top side, HOB data corresponding to each line of the effective region of the top side, and VOB data. Below, the effective region of the top side and the HOB corresponding to each line of the effective region of the top side are together referred to as the top side region, and the effective region of the bottom side and the HOB corresponding to each line of the effective region of the bottom side are together referred to as the bottom side region. In the present embodiment, the regions that each of the image processing circuits process are set so that a portion of the boundaries between the top side region and the bottom side region overlap. The reason for this is that the same result can be obtained when development processing is performed on the boundary portion between the top side region and the bottom side region in each of the image processing circuits 102 and 103. Furthermore, in the present embodiment, the top side region and the bottom side region are set so that the numbers of pixels of the effective region that the master image processing circuit 102 and the slave image processing circuit 103 process are the same number of pixels. For example, the effective region of the image data outputted from the imaging unit 101 is horizontally 4096 pixels×vertically 2160 pixels, and so the top side region and the bottom side region are respectively set to be horizontally 4096 pixels×vertically 1080+α pixels. The number of pixels α of the region that overlaps corresponds to the number of pixels used for development processing. In this way, by setting the region that the slave image processing circuit 103 processes, it is possible to consecutively transmit, for one frame, the VOB, image data of the effective region of the top side, and the HOB of the top side from the master image processing circuit 102 to the slave image processing circuit 103. Accordingly, the slave image processing circuit 103 is enabled to use HD and VD to receive an image by control similar to in a case where unprocessed image data of one frame is received. Note that in a case where obtaining the same result when performing development processing is not considered, it is possible to set so not to have a region in which the top side region and the bottom side region overlap. In such a case, the effective region of one frame is divided into top and bottom halves, and the divided top side region and bottom side region are set.

FIG. 2 is referenced once again. The pre-processing unit 211 retrieves regions (reference numeral 402 illustrated in FIG. 4A) in the image data of one frame sent from the communication unit 210 that is processed in the master image processing circuit 102. Specifically, in the example of the present embodiment, the pre-processing unit 211 retrieves image data of a region of the bottom side and the VOB. Also, the pre-processing unit 211 performs correction processing such as a scratched pixel correction on the retrieved image data. In this way, the pre-processing unit 211 does not output image data of the effective region of the top side which is image data that is not processed in the master image processing circuit 102. For this reason, control is performed so that after this, the image data of the effective region of the top side is not processed in the master image processing circuit 102, and also that data is not stored in the memory 105.

The OB correcting unit 212 performs image correction which is predetermined image processing by using image data of the OB area. For example, noise of a fixed pattern that occurs due to a dark current of the imaging unit 101 or the like is reduced by using the VOB and HOB image data, to correct a black level of the image signal. The OB correcting unit 212 outputs a corrected image as an intermediate image 213 to the memory 105. Note that blocks that perform processing after the pre-processing unit 211 process approximately half the image data of one frame. For this reason, the master image processing circuit 102 and the slave image processing circuit 103 each have the capability to process data of approximately half the number of pixels of one frame of moving image data from the imaging unit 101 at 60 fps in real time. Also, the configurations that perform processing prior to the pre-processing unit 211 must have the capability to process an entire frame of the moving image data from the imaging unit 101 at 60 fps in real time.

The image processing unit 214 applies various appropriate processing such as development processing, geometric transformation, resizing, noise reduction, or the like on inputted image data. For example, the image processing unit 214 converts the number of pixels of the inputted image data in accordance with the size (the number of pixels) of the display screen of the display apparatus 108. In the present embodiment, configuration is such that the size of the display screen of the display apparatus 108 is smaller than the size of the inputted image data. For this reason, the image processing unit 214 generates image data for display by reducing the screen size of the inputted image data. After this, the image processing unit 214 outputs the display image 215 and an image for storage 216 to the memory 105. The encoding unit 217 reads out the image for storage 216 from the memory 105, and applies image compression processing. A known format such as H.264 may be used as the compression format. The encoding unit 217 outputs the compressed stream image 218 to the memory 105.

The control unit 219 includes, for example, a CPU, an MPU, a ROM, a RAM, or the like. Then the control unit 219 loads a program stored in a ROM which is a non-volatile storage medium into a RAM which is a volatile storage medium. The CPU of the control unit 219 controls operation of each unit of the master image processing circuit 102 by executing a program loaded into the RAM. Note that, in FIG. 2, from the perspective of guaranteeing visibility of the view, connections between the control unit 219 and blocks other than the master image processing circuit 102 are not illustrated, but the control unit 219 and these blocks are connected, and transmission/reception of control signals and necessary data is performed. Also, the control unit 219 of the master image processing circuit 102 is able to perform transmission/reception of control signals or the like with blocks other than the operation unit 104 and the imaging unit 101. The CPU of the control unit 219, by executing a program, controls operation of each of these blocks, and controls operation of the digital camera 100 as a whole.

The slave image processing circuit 103 applies processing that is basically similar to that of the master image processing circuit 102 to the image data of the top side region of each frame transmitted from the master image processing circuit 102. The communication unit 220 sends transmitted VOB data and unprocessed image data of the top side region to the pre-processing unit 221. Also, the communication unit 220, as is described later, retrieves the stream image 218 and the display image 215 of the bottom side region transmitted from the master image processing circuit 102, and stores them in the memory 106. The pre-processing unit 221 performs similar processing to the pre-processing unit 221 of the master image processing circuit 102. However, because unprocessed image data transmitted from the communication unit 220 is the VOB and image data of the top side region, the pre-processing unit 221 processes all of the data of the VOB and the image data of the top side region transmitted from the communication unit 220 and transmits the result to the OB correcting unit 222. The OB correcting unit 222 performs an OB correction on the image data of the top side region, and stores in the memory 106, as an intermediate image 223, the image data on which the OB correction processing has been performed. The image processing unit 224 applies various processing on the image data (the intermediate image 223) of the top side region stored in the memory 106, generates a display image 225 and a storage image 226, and stores these in the memory 106. The encoding unit 227 reads the storage image 226 from the memory 106, compresses it, and stores it in the memory 106 as a stream image 228 which is compressed image data.

The storage control unit 230 sequentially reads from the memory 106 the stream image 228 which was compressed by the encoding unit 227 and the stream image 218 which was transmitted from the master image processing circuit 102, and stores them in the storage medium 107. The display control unit 231 sequentially reads from the memory 106 the display image 225 which was processed by the image processing unit 224 and the display image 215 which was transmitted from the master image processing circuit 102, and displays an image on the display apparatus 108. Note that, in the present embodiment, the stream image 218 and the display image 215 transmitted from the master image processing circuit 102 are first written to the memory 106, and then processing is performed via the memory 106. However, configuration may be taken to directly transmit these to the storage control unit 230 and the display control unit 231 without going through the memory 106.

(Image Data Transmission Processing Between Image Processing Circuits)

Next, with reference to FIG. 3, transmission processing for transmitting image data from the master image processing circuit 102 to the slave image processing circuit 103 is described. In FIG. 3, the abscissa is a time axis t, and reference numeral 301 denotes a timing at which a vertical synchronizing signal VD rises and falls in the time period of each frame. Reference numeral 302 represents a timing at which image data is outputted from the imaging unit 101. The VOB, the top side region, and then the bottom side region are outputted from the imaging unit 101 to the master image processing circuit 102 in that order. Note that the HOB time period is omitted, but in reality the HOB is present for every line. Reference numeral 303 represents a timing at which data is transmitted from the master image processing circuit 102 to the slave image processing circuit 103.

Reference numeral 311 denotes a timing at which the top side region and the VOB of the image data are transmitted from the imaging unit 101. The VOB image data and the top side region image data are transmitted together. That is, no other image data is transmitted between the image data of the VOB and the image data of the top side region, and the VOB image data and the top side region image data is transmitted consecutively without a space. Reference numeral 312 is an interrupt signal. When the communication unit 210 completes transmitting the VOB and the top side region image data for one frame, it sends an interrupt signal 303 to the control unit 219, and notifies the completion of transmission of one frame of VOB and top side region image data. Reference numeral 313 indicates a space time period in which the image data from the imaging unit 101 is not being transmitted in the time period of image data of one frame. A time period that combines the time period in which the master image processing circuit 102 receives image data of the bottom side region from the imaging unit 101 and a blanking period of a VD 301 becomes the collective (maximized) space time period 313. The master image processing circuit 102 transmits the VOB and top side region data consecutively without a space, and therefore it is possible to guarantee, as the space time period 313, a collective transmission period outside of the time period for transmitting unprocessed image data that is from the imaging unit 101 to the slave image processing circuit 103.

For comparison with the transmission in the present embodiment, an example of a case in which the master image processing circuit 102 processes the top side region oppositely to the present embodiment is described. FIG. 4B illustrates image data in a case in which the master image processing circuit 102 processes the top side region oppositely to the present embodiment. The master image processing circuit 102, as illustrated in reference numeral 404, processes data of the top side region, the HOB of each line thereof, and the VOB. On the other hand, the master image processing circuit 102 transmits the VOB, the bottom side region, and the HOB of each line thereof to the slave image processing circuit 103. In such a case, because the data of the VOB and the data of the bottom side region are received from the imaging unit 101 temporally separated, the timing of the transmission is different as described below.

Figure 5:
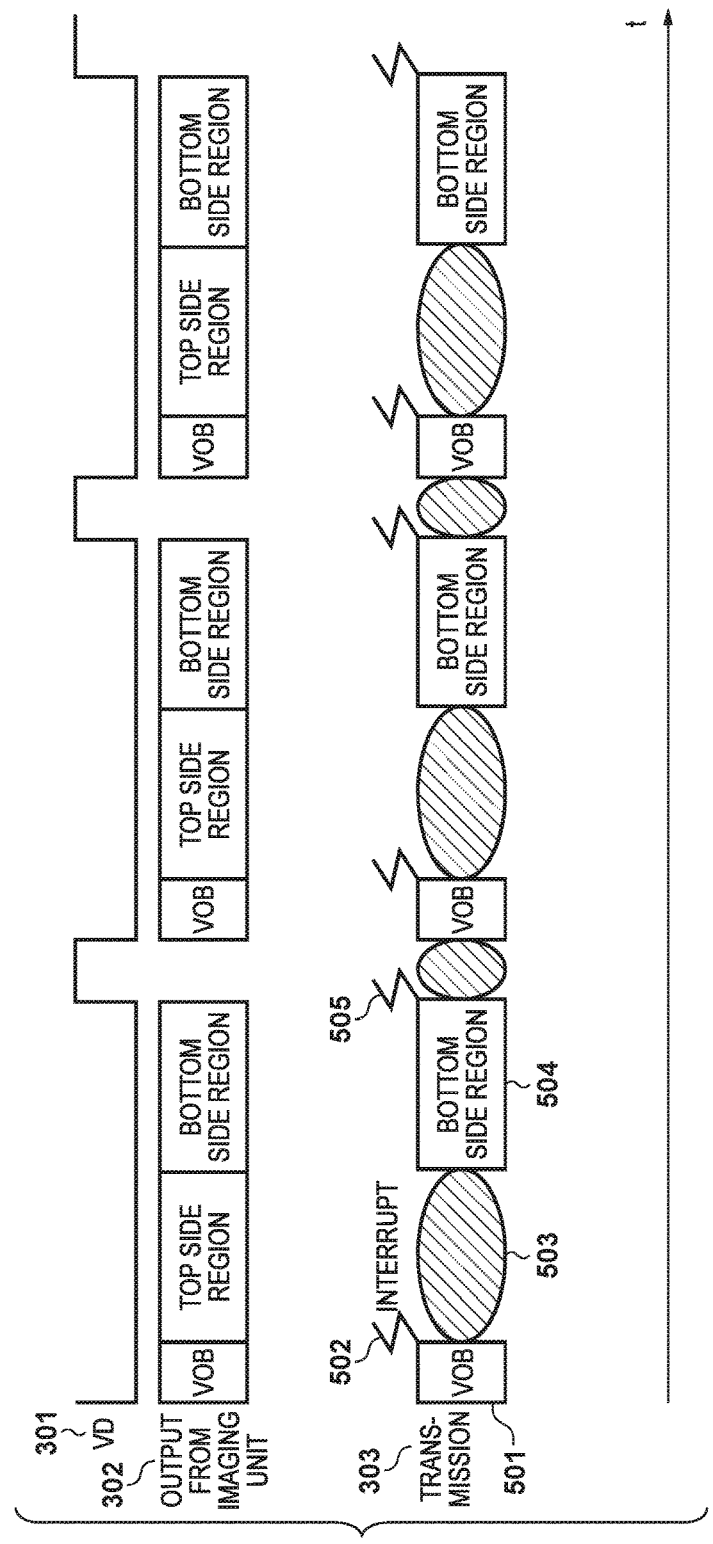
FIG. 5 is a view illustrating schematically an example of image data transmission timing that is different to the first embodiment.

FIG. 5 illustrates image transmission timing in a case in which the master image processing circuit 102 processes the top side region oppositely to the present embodiment. The communication unit 210, when the VOB transmission 501 completes, transmits an interrupt signal 502 to the control unit 219, and notifies the VOB transmission completion. Continuing from the VOB, the image data of the top side region is outputted from the imaging unit 101, but the top side region image data is not processed in the slave image processing circuit 103. For this reason, in the time period in which the image data of the top side region is being received from the imaging unit 101, image data is not transmitted to the slave image processing circuit 103, and this time period is a space time period 503. When, after that, the bottom side region image data is outputted from the imaging unit 101, the communication unit 210, after the occurrence of the space time period 503 after transmitting the VOB, performs the bottom side region transmission 504, and after that, transmits an interrupt signal 505 that notifies to the control unit 219 the completion of the bottom side region transmission. As illustrated in FIG. 5, the transmission period becomes divided in the case where the master image processing circuit 102 is attempting to transmit the VOB and the bottom side region to the slave image processing circuit 103. Also, in such a case, the slave image processing circuit 103 cannot receive the bottom side region image data by using the VD signal. For this reason, the communication unit 210 must generate a synchronization signal for the slave image processing circuit 103 to receive the bottom side region image data, and transmit it to the slave image processing circuit 103.

As mentioned above, by transmitting to the slave image processing circuit 103 the VOB and the region of the portion of the top side in each frame from the imaging unit 101 (as in the present embodiment), it is possible to guarantee a collective transmission period. In this way, because the number of interrupts and the command overhead for transmission becomes smaller, it is possible reduce the system load, and to improve transmission efficiency.

Figure 6:
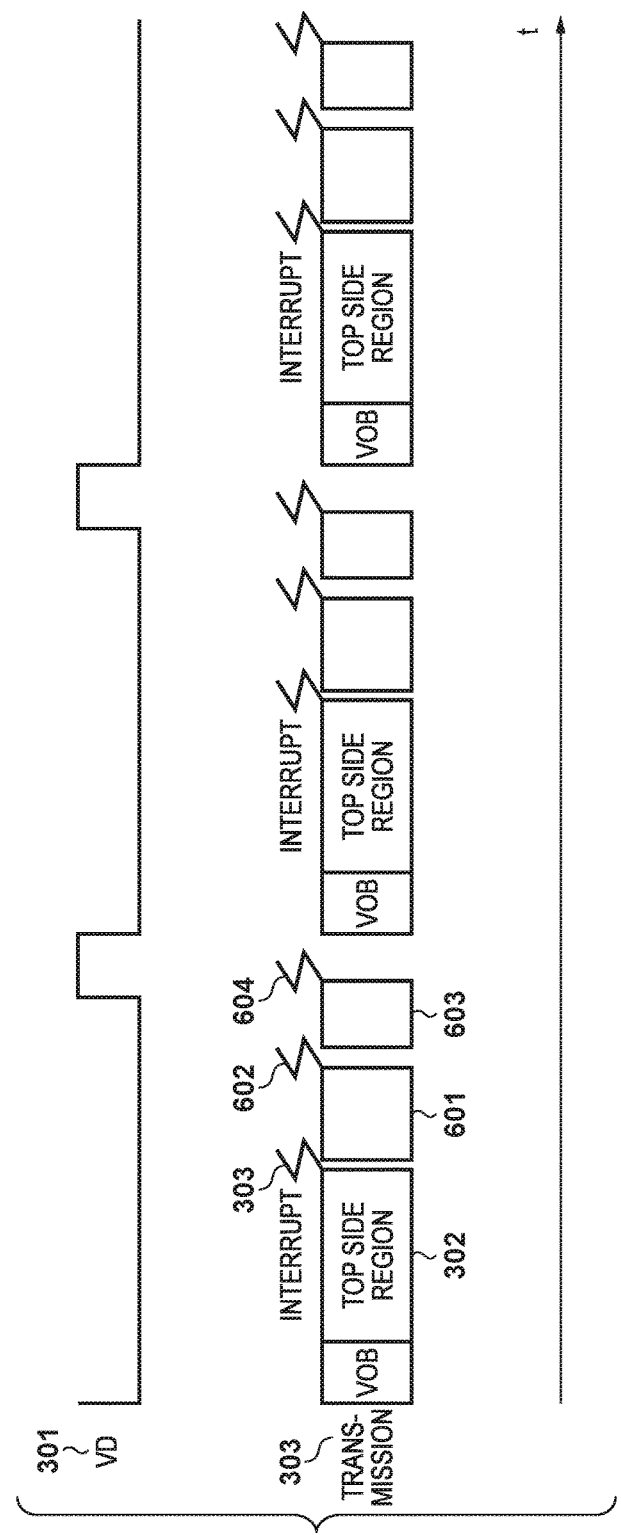
FIG. 6 is a view illustrating schematically another example of image data transmission timing according to a first embodiment.

In the present embodiment, FIG. 6 illustrates a timing in a case where image data for display and compressed stream data is transmitted from the master image processing circuit 102 to the slave image processing circuit 103 by using a space time period which is a time period in which unprocessed image data that is from the imaging unit 101 is not being transmitted to the slave image processing circuit 103 from the master image processing circuit 102. As described above, because the display image data 215 is smaller than the screen size of the image data that is from the imaging unit 101, its data amount is smaller than the image data from the imaging unit 101. Also, because compression processing is performed for the stream data 218 for storage, its data amount is smaller than the image data that is from the imaging unit 101. For this reason, the communication unit 210, transmits the display image data 215 and the stream data 218 for storage during a time period of a space from the completion of the transmission of the VOB and top side region image data to the slave image processing circuit 103 until transmission of the VOB and top side region image data of the next frame. When the communication unit 210 transmits the display image 215 during a time period indicated by reference numeral 601, and the transmission of the display image 215 completes, the completion of the transmission is notified to the control unit 219 by an interrupt signal 602. Next, in the time period indicated by reference numeral 603, the communication unit 210 transmits the stream image 218 similarly, and when the transmission of the stream image 218 completes, notifies to the control unit 219 the completion of the transmission by an interrupt signal 604.

Note that in the present embodiment, an example of a case in which the VOB and the HOB respectively exist in regions at the top and the left of the image is described, but the positions of the VOB and the HOB are not limited to these positions, and, for example, the VOB may be present in a region at the bottom of the image, and the HOB may be present in a region at the right of the image. In a case where the VOB is at the bottom, it is possible to expect a similar effect to that of the above described present embodiment if the VOB and the lower half are transmitted to the slave image processing circuit 103.

Also, in the present embodiment is described an example in which, in the configuration there are two image processing circuits (the master image processing circuit 102 and the slave image processing circuit 103), and each image processing circuit processes a region of a portion of the top side and the bottom side in an effective region. However, the present embodiment can be applied to a case in which image processing is performed using three or more image processing circuits. In such a case, assume configuration is taken such that three or more processing regions from the effective region of one frame are set so that at least a portion of the regions are different, and each image processing circuit processes a different processing region. For example, in a case where three image processing circuits are connected in series, the first image processing circuit (on the most upstream side) receives image data from an imaging unit. Then, the first image processing circuit sets a top side region, an intermediate region, and a bottom side region from the effective region of one frame, at least a portion of which is different, and collectively transmits, to the second image processing circuit, image data of the VOB, the top side region, and the intermediate region. Also, the first image processing circuit processes the region of the bottom side of the effective region and the VOB. The second image processing circuit processes the intermediate region and the VOB which are the bottommost regions out of the received VOB, top side region, and intermediate region. Also, the second image processing circuit transmits collectively, to the third image processing circuit, image data of the VOB and the top side region which is the topmost region of the received effective regions. Then, the third image processing circuit processes the VOB and the top side region image data. Also, the first image processing circuit transmits the display image and stream data for storage that it processed itself to the second image processing circuit in a time period of a space when unprocessed image data is not being transmitted to the second image processing circuit, as described above. The second image processing circuit transmits, to the third image processing circuit, in a time period of a space when unprocessed image data is not being transmitted to the third image processing circuit, processed image data of the bottom side region received from the first image processing circuit and display image and stream data for storage of the intermediate region that it processed itself, as described above. With such a configuration, it is possible to realize distributed processing using three or more image processing circuits, and it is possible to guarantee a larger collective transmission period while reducing the processing load of each image processing circuit.

Also, in the present embodiment, the number of pixels of the top side region and the bottom side region are set to be the same. However, configuration may be taken to set so that the numbers of pixels of the top side region and the bottom side region are different. For example, the numbers of pixels of the top side region and the bottom side region may be set to a predetermined ratio (for example 3:7). In the case of setting the numbers of pixels of the top side region and the bottom side region to 3:7, the master image processing circuit 102 processes a region of 70 percent on the bottom side and the VOB, for example, and on the other hand transmits data including a region of 30 percent on the top side and the VOB collectively to the slave image processing circuit 103. Specifically, similarly to in the above described example, configuration may be taken to transmit, to the slave image processing circuit 103, the VOB region and a portion of the effective region that is temporally continuous therewith, and to have the master image processing circuit 102 process the VOB and the remaining effective region. With such a configuration, it is possible to adjust the division of the load between the image processing circuits (in accordance with capability, role, or the like), and it is possible to guarantee a larger collective transmission period.

In the present embodiment as described above, configuration is taken to connect a plurality of image processing circuits in series (specifically, to input image data into a master image processing circuit, and to input image data to be handled by the slave image processing circuit from the master image processing circuit), and to divide the processing. With such a configuration, it is not necessary to transmit image data at high speed to each of the image processing circuits from the imaging unit. Also, in the present embodiment, configuration is taken to transmit temporally continuous data as a whole (specifically, the VOB and the top side effective region) to the slave image processing circuit 103 from the master image processing circuit 102 which is on the upstream side. With such a configuration, the communication unit 210 can guarantee a collective transmission period from after the VOB and the top side effective region image data are transmitted to the slave image processing circuit 103 until the VOB and top side effective region image data of the next frame are transmitted. Additionally, the communication unit 210 does not issue to the control unit 219 an interrupt signal until the VOB and top side effective region image data transmission is completed, and therefore it is possible to reduce the load on the system by suppressing the occurrence of interrupt signals or the like. For this reason, transmission efficiency is raised, and system performance improves. In other words, in a case where a plurality of image processing circuits are used, it is possible to reduce a processing load on each image processing circuit, and process image data at high speed.

Second Embodiment

Next, a second embodiment is described. The second embodiment differs from the first embodiment in that the master image processing circuit 102 generates a reduced image, transmits it to the slave image processing circuit 103, and each image processing circuit performs image processing based on the reduced image. However, the configuration of the digital camera 100 according to the second embodiment, other than these differences in configuration, is similar to the configuration of the digital camera 100 according to the first embodiment illustrated in FIG. 1 and FIG. 2. For these reasons, the same reference numerals are given to the same elements, overlapping explanation is omitted, and predominantly explanation is given for differences.

FIG. 7 illustrates an example of a functional configuration of the master image processing circuit 102 and the slave image processing circuit 103 that configure the digital camera 100 according to the present embodiment. The pre-processing unit 211 of the master image processing circuit 102, similarly to in the first embodiment, outputs image data of the bottom side region, and does not output image data of the top side region to the OB correcting unit 212. Meanwhile, the pre-processing unit 211, for each frame, sends image data of an entire frame to a reduction processing unit 711. The reduction processing unit 711, for each frame, generates a reduced image for an entire frame, and stores it in the memory 105 as a reduced image 712. An evaluation value calculating unit 713 reads out the reduced image 712 from the memory 105, calculates an evaluation value corresponding to the reduced image 712, and outputs the evaluation value and the reduced image 712 to the image processing unit 214. Also, in the present embodiment, other than the communication units 210 and 220, the configuration is such that communication units 714 and 724 are comprised. Also, by a communication path comprised from the communication units 714 and 724, the display image 215 and the stream image 218 are transmitted/received.

The communication unit 210, similarly to in the first embodiment, transmits, to the slave image processing circuit 103, the VOB and top side effective region image data out of each frame of the image data from the imaging unit 101. Also, the communication unit 210 does not transmit, to the slave image processing circuit 103, image data of the bottom side region (specifically, data other than the portion of the top side region) out of each frame of image data that is from the imaging unit 101. Furthermore, the communication unit 210 reads out the reduced image 712 from the memory 105, and transmits it to the communication unit 220 of the slave image processing circuit 103. The communication unit 220 outputs the received reduced image to an evaluation value calculating unit 723. The evaluation value calculating unit 723 calculates the evaluation value by using the received reduced image, and outputs it to the image processing unit 224 in the slave image processing circuit 103 as well.

The evaluation values that the evaluation value calculating units 713 and 723 calculate indicate low bandwidth image information used when the image processing unit 214 and the image processing unit 224 execute development processing, for example. For example, the image processing unit 214 performs known image processing such as digital dodging by using the evaluation values represented in low bandwidth image information. In a case in which digital dodging is performed, the evaluation value calculating unit 713 converts the reduced image 712 into gain information, and magnifies it to the full size of the inputted image data. The image processing units 214 and 224 can produce a dodging effect that lifts a low-luminance region of an object by performing gain processing on an intermediate image by using gain information magnified to a full size. Note that the evaluation value that the evaluation value calculating unit 713 calculates is not limited to this, and it is possible to calculate an evaluation value using an entire angle of view such as for image motion vector detection, object detection, or the like.

Also, the reason that the master image processing circuit 102 reduces an image of each frame of image data received from the imaging unit 101, and then transmits the reduced image to the slave image processing circuit 103 is as follows. Generally, to obtain low bandwidth information, wide range image data is necessary. As described previously, in a case when attempting to obtain low bandwidth information by processing a bottom side region image in the master image processing circuit 102, and processing a top side region image in the slave image processing circuit 103, it is necessary to process top side region and bottom side region images whose boundary portion overlap in the respective image processing circuits. Because the amount of processing of each image processing circuit increases proportionally to the overlapping region, it leads to throughput reduction and bus bandwidth stress, and processing performance deteriorates. For example, in a case in which the reduction factor is 1/256 in the reduction processing unit 711, and vertical direction 5-tap filter processing is performed in the evaluation value calculating unit 713, the overlap in the vertical direction of the top side region and the bottom side region is 256×2=512 lines. Accordingly, the processing amount in relation to image data increases, which becomes the cause of the performance of each image processing circuit deteriorating. On the other hand, by the master image processing circuit 102 reducing the image of one frame, and then transmitting the reduced image to the slave image processing circuit 103 as described above, it is possible to avoid each image processing circuit processing a top side region and a bottom side region that include overlapping portions, and to suppress deterioration of performance.

Next, with reference to FIG. 8, timing of transmission of the image data and the reduced image 712 according to the present embodiment is described. FIG. 8, similarly to FIG. 3, illustrates the timing at which data is transmitted from the communication unit 210 of the master image processing circuit 102 to the communication unit 220 of the slave image processing circuit 103. Also, similarly to FIG. 3, the abscissa is a time axis t, and reference numeral 301 indicates a vertical synchronizing signal VD, and reference numeral 302 indicates image data outputted from the imaging unit 101. Note that the display image 215 and the stream image 218 transmitted/received between the communication units 714 and 724 are not illustrated, but may be transmitted to the slave image processing circuit 103 in synchronism with the timing of VD as illustrated by reference numeral 301. Specifically, the display image 215 and the stream image 218 may be transmitted via the other transmission channel configured by the communication unit 714 and the communication unit 724 which is different to the transmission channel configured by the communication unit 210 and the communication unit 220.

Reference numeral 801 indicates the timing at which the reduction processing unit 711 reduces the image. The reduction processing unit 711 directly processes the image data of each frame outputted from the imaging unit 101 in reduction processing without storing it in the memory 105. Therefore, the reduction processing unit 711 can perform reduction processing in parallel to output of image data from the imaging unit 101. Reference numeral 802 indicates the timing at which image data and reduced image is transmitted to the slave image processing circuit 103. Similarly to the first embodiment, the communication unit 210 first transmits the VOB and the top side region of the frame, and notifies to the control unit 219 the interrupt 312 that indicates the completion of the transmission of the top side region. Next, the communication unit 210 transmits the reduced image 712 to the slave image processing circuit 103, and notifies to the control unit 219 an interrupt 803 which indicates the completion of the transmission of the reduced image.

As illustrated in FIG. 8, in the present embodiment, the reduced image 712 reduces the same frame as the frame that is being outputted during the output of image data that is from the imaging unit 101. Therefore, the reduction processing and the transmission of the reduced image 712 are performed in parallel. At that time, the communication unit 210 must sequentially transmit the pixel information on which the reduction processing is performed without waiting for the next frame. Access for reading/writing the reduced image 712 to the memory 105 by the reduction processing unit 711 and by the communication unit 210 operates so that the above described function is realized. Specifically, after data of the reduced image of the frame is written to the memory 105 by the reduction processing unit 711, the communication unit 210 is controlled to perform a read out. Note that, limitation is not made to this operation, and output of the reduction processing unit 711 may be sent directly to the communication unit 210 without going through the memory 105.

Note that, unlike the present embodiment, in a case when attempting to transmit the VOB and the bottom side region image data to the slave image processing circuit 103, the duration between the VOB image data transmission timing and the bottom side region image data transmission timing is short, and there is the possibility of overlap with the reduced image transmission timing and that transmit will not be possible. Specifically, there is a possibility that the timing at which the reduced image is transmitted will be after the bottom side region image data is transmitted (the transmission timing becomes delayed), and as a result it will lead to a delay in the timing of other processing. Meanwhile, in the present embodiment described above, since it is possible to transmit the reduced image during the long space after transmission of the top side region image data, it is possible to avoid the above described timing delay.

As described above, in the present embodiment, in a configuration in which a plurality of image processing circuits are connected in series and processing is divided, VOB and top side region data is transmitted as a whole to the slave image processing circuit 103 from the master image processing circuit 102 which is an upstream side processing circuit. By this, the communication unit 210 can guarantee a collective transmission period. So, configuration is taken so as to, at a timing of a frame that is the same as the frame of the image of the top side region and the VOB being transmitted to the slave image processing circuit 103, transmit the reduced image of the frame. With such a configuration, in a case where in a plurality of image processing circuits, predetermined image processing such as dodging is divided and executed, it ceases to be necessary to input overlapping image data to the respective image processing circuits, and it is possible to reduce the processing burden on each image processing circuit. Thus, even in a case when transmitting the reduced image of the whole image to use low bandwidth information, it is possible to suppress a delay of the timing of transmission between the circuits to a minimum. Specifically, in a case where image processing that uses low bandwidth information is performed, in addition to being able to reduce the load on the system due to transmit efficiency improving, it is possible to further improve system performance by image processing that uses a reduced image. In other words, in a case where a plurality of image processing circuits are used, it is possible to reduce a processing load on each image processing circuit, and process image data at high speed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-167286, filed Aug. 29, 2016, which is hereby incorporated by reference herein in its entirety.

What is claimed is:

1. An image processing apparatus comprising:
an imaging unit comprising an image sensor including a vertical light-shielded region and an effective region that is not light-shielded;
a first image processing circuit connected to the imaging unit; and
a second image processing circuit connected to the first image processing circuit,
wherein the first image processing circuit:
receives image data from the imaging unit, and
applies, to image data of a first region which is a portion of the effective region of a frame of the image data received from the imaging unit, predetermined image processing by using image data of the vertical light-shielded region of the frame,
the first image processing circuit:
sets as a second region, out of the effective region of the frame, a portion that is at least partially different to the first region and that is contiguous with the vertical light-shielded region, and
consecutively transmits, to the second image processing circuit, (i) the image data of the vertical light-shielded region and (ii) unprocessed image data of the second region to which the predetermined image processing has not been applied, and
the second image processing circuit:
receives the image data of the vertical light-shielded region of the frame and the unprocessed image data of the second region transmitted from the first image processing circuit, and
applies the predetermined image processing to the unprocessed image data of the second region received from the first image processing circuit, by using the image data of the vertical light-shielded region received from the first image processing circuit.

2. The image processing apparatus according to claim 1, wherein the imaging unit outputs the image data of the effective region after the image data of the vertical light-shielded region in the frame, and
the first image processing circuit sets a portion of a top side in the effective region of the frame as the second region, and sets a portion of a bottom side of the effective region of the frame as the first region.

3. The image processing apparatus according to claim 2, wherein the image sensor has a horizontal light-shielded region, and
the first image processing circuit sets the portion of the bottom side and the horizontal light-shielded region corresponding to the portion of the bottom side as the first region, and sets the portion of the top side and the horizontal light-shielded region corresponding to the portion of the top side as the second region.

4. The image processing apparatus according to claim 1, wherein the first image processing circuit does not perform the predetermined image processing on image data in the effective region outside of the first region, and
the first image processing circuit does not transmit to the second image processing circuit unprocessed image data in the effective region other than the portion set as the second region.

5. The image processing apparatus according to claim 1, wherein the image data of the vertical light-shielded region and the unprocessed image data of the second region is transmitted to the second image processing circuit via a predetermined transmission channel, and image data of the first region to which the predetermined image processing has applied by the first image processing circuit is transmitted to the second image processing circuit via the predetermined transmission channel in a time period in which the image data of the vertical light-shielded region and the unprocessed image data of the second region are not being transmitted.

6. The image processing apparatus according to claim 1, wherein the first image processing circuit sets, as the first region, a portion that is not contiguous with the vertical light-shielded region in the effective region.

7. The image processing apparatus according to claim 1, wherein the predetermined image processing includes processing for correcting the image data of the effective region by using the image data of the vertical light-shielded region.

8. The image processing apparatus according to claim 1, wherein the imaging unit outputs moving image data,
the first image processing circuit receives the moving image data outputted from the imaging unit, and applies the predetermined image processing to the first region in a plurality of frames of the moving image data, and
the first image processing circuit transmits, to the second image processing circuit, the image data of the vertical light-shielded region and the image data of the second region of a plurality of frames of the moving image data.

9. The image processing apparatus according to claim 1, wherein the first image processing circuit is a single chip integrated circuit, and the second image processing circuit is a single chip integrated circuit that is different from the first image processing circuit.

10. The image processing apparatus according to claim 9, further comprising:
a first memory connected to the first image processing circuit; and
a second memory connected to the second image processing circuit,
wherein the first image processing circuit transmits image data of the second region, out of the image data received from the imaging unit, to the second image processing circuit without storing the image data in the first memory.

11. The image processing apparatus according to claim 1, further comprising:
a display unit connected to the second image processing circuit,
wherein the first image processing circuit transmits, to the second image processing circuit, the image data of the first region to which the predetermined image processing was applied by the first image processing circuit, and
the second image processing circuit:
generates image data for displaying of a frame by using (i) the image data of the first region to which the predetermined image processing was applied and that was transmitted from the first image processing circuit and (ii) the image data of the second region to which the predetermined image processing was applied by the second image processing circuit, and
displays, to the display unit, the image data for displaying.

12. The image processing apparatus according to claim 1, wherein the second image processing circuit is not connected to the imaging unit to receive the image data from the imaging unit.

13. An image processing apparatus comprising:
an imaging unit comprising an image sensor including a vertical light-shielded region and an effective region that is not light-shielded;
a first image processing circuit connected to the imaging unit; and
a second image processing circuit connected to the first image processing circuit,
wherein the first image processing circuit:
receives image data from the imaging unit, and
applies, to image data of a first region which is a portion of the effective region of a frame of the image data received from the imaging unit, predetermined image processing by using image data of the vertical light-shielded region of the frame,
the first image processing circuit transmits, to the second image processing circuit, (i) the image data of the vertical light-shielded region of the frame and (ii) unprocessed image data, to which the predetermined image processing has not been applied, of a second region, which is at least partially different from the first region, out of the effective region of the frame, and
the second image processing circuit:
receives the image data of the vertical light-shielded region of the frame and the unprocessed image data of the second region transmitted from the first image processing circuit, and
applies the predetermined image processing to the unprocessed image data of the second region received from the first image processing circuit by using the image data of the vertical light-shielded region received from the image processing circuit.

* * * * *